UNITED STATES PATENT OFFICE.

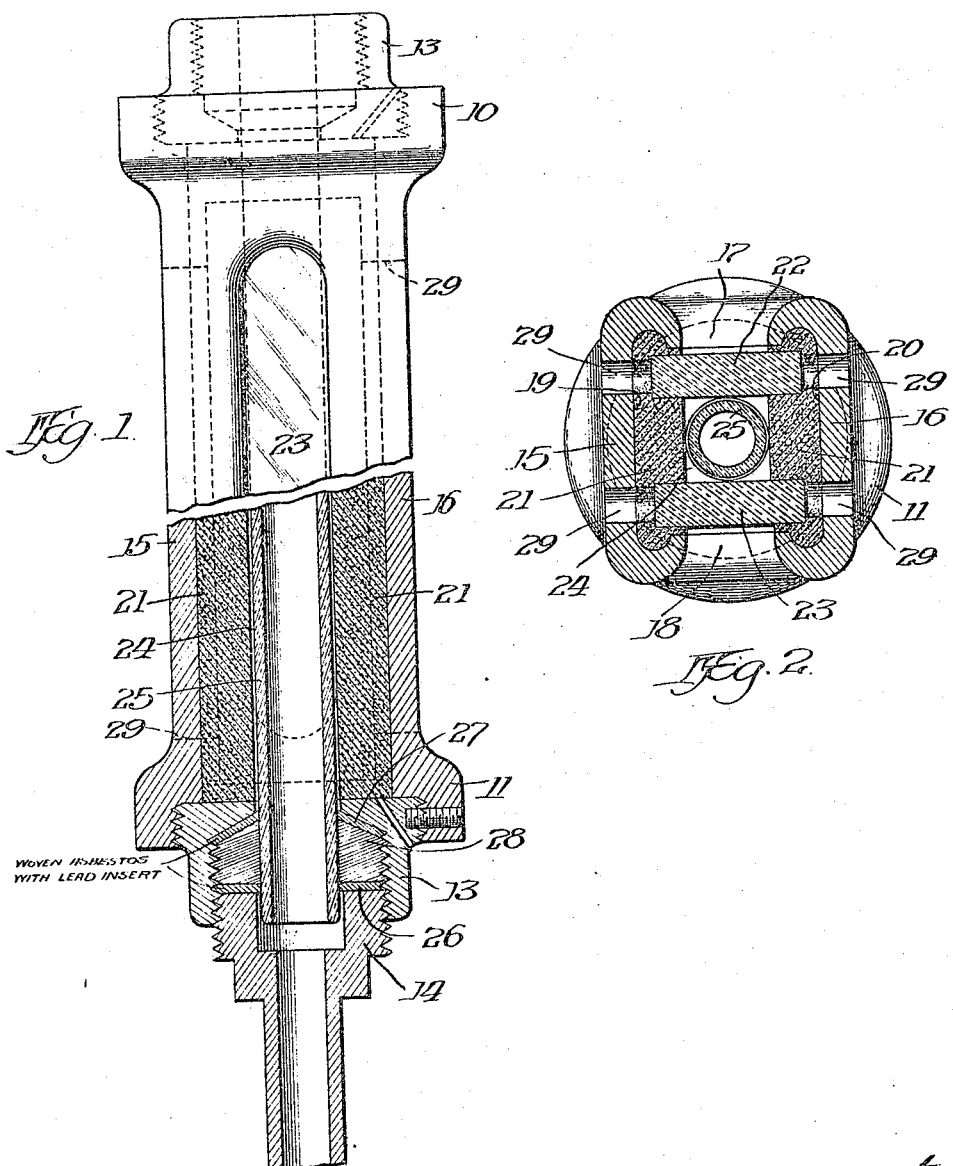

GEORGE H. SARGENT, OF CHICAGO, ILLINOIS, ASSIGNOR TO SARGENT COMPANY, OF CHICAGO, ILLINOIS, A CORPORATION OF ILLINOIS.

GAGE-GLASS.

1,285,407.　　　　Specification of Letters Patent.　　Patented Nov. 19, 1918.

Application filed June 14, 1917.　Serial No. 174,684.

*To all whom it may concern:*

Be it known that I, GEORGE H. SARGENT, a citizen of the United States, and resident of Chicago, in the county of Cook and State of Illinois, have invented certain new and useful Improvements in Gage-Glasses, of which the following is a specification.

My invention relates to water gage glasses, and particularly to an improvement on the construction shown in my prior Patent No. 1,176,251 of March 21, 1916.

In that patent the advantage was set forth of providing a specified clearance between the outer surface of the tubular glass and the inner surface of the protecting element. This principle has been found to be correct and of the utmost importance. However, certain difficulties have been encountered in holding the protecting glass panels in place, in the selection of the proper material for molding and in securing the molded glass panels.

I have conceived of a construction in which a flat rectangular glass panel may be advantageously employed. In this device I utilize a metallic shell similar in form to that shown in my prior patent referred to. The hydraulically setting material employed for setting the glass panels is preferably composed of substantially equal portions of Portland cement and crushed marble which after having been poured and allowed to set is treated with a cement hardening solution. This solution so hardens and vitrifies the substance that it becomes substantially as hard and incompressible as glass and holds the panels with great firmness, at the same time resisting any tendency to break when struck by splinters of the glass tube whenever the latter breaks.

It has heretofore been thought essential to provide glass panels having convex surfaces in order to magnify the water column. I have found that it is not essential to employ protecting panels having convex surfaces as the magnification of the water level, as is well known, results from the curved, cylindrical glass walls of the water-tube, so that the optical effect created results in the water level being very marked and consequently easily discerned by a quick glance.

The object of the glass panels is to provide means for protecting the water-tube or glass from external injury or violence, and, in the event of the fracture of the inner tube or water-glass, to prevent a dissemination or scattering of particles of glass and the contained fluid; while at the same time providing means whereby the stage of water in the inner tube or water-glass may be observed.

It is essential, in a device of this character, that the casing possess sufficient rigidity to maintain the proper connections of the water-glass or inner tube with the boiler, and also enable proper support for the glass panels so as to avoid any strains on the glass.

A further object of the invention is to provide a construction whereby proper illumination of the water column may be obtained, without interfering with the attendants' vision.

The invention will be more readily understood by reference to the accompanying drawings, wherein—

Figure 1 is a side elevation, partly in section, of a gage glass protector constructed in accordance with my invention, and Fig. 2 is a transverse section thereof.

In the drawings, it will be seen that the metallic casing is composed of two annular heads, 10, 11, internally threaded to accommodate the couplings 13, 13, within which the nipples 14, are secured. The two heads are connected by solid panels 15, 16, at diametrically opposite sides. The sight openings 17, 18, are provided in the casing in the other two sides.

As shown in Fig. 2, the metallic sides 15, 16 are dished or recessed, as shown at 19, 20, to receive a suitable hydraulically setting material 21 which is molded in the casing. The glass panels 22, 23, of suitable thickness and formation, and preferably of greater length and width than the sight openings 17 and 18, are placed within the casing transversely of the sight openings, with the marginal edges of the panels embedded in said material 21 molded in the recesses, without providing contact between the glass panels and the metallic walls of the casing. In order to properly mold the material 21 with the edges of the glass panels embedded therein, a suitable core or mandrel is employed to provide a chamber 24 extending longitudinally throughout the casing and adapted to receive the usual gage-tube or water-glass 25. For the reasons mentioned in my prior Patent No. 1,176,251 the transverse dimensions of the chamber 24 are but slightly greater than the outer diameter of the tube 25, so as to provide a minute space between the tube 25 and the inner surfaces of the glass panels 22 and 23, as shown in Fig. 1. The transverse dimensions of the chamber 24 are such as to permit slight variation in the diameter of the gage-glass, or water-tube, and yet provide the intimate relation between the tube and glass panels without actual physical contact therewith; in other words, one object of the invention is to provide a construction as herein shown and described wherein the space between the panels and the water-tube will be reduced to a minimum without, however, interfering with the other advantages obtained by my construction and herein enumerated.

The hydraulically setting material 21 is hardened, as hereinafter described; the particular composition or material herein specified and treatment mentioned, providing a filler or inner coating for the casing that will not be affected by splinters of glass when the water gage glass is broken; furthermore, this filler provides an unyielding solid and rigid mass whereby the glass panels mounted therein are enabled to resist pressure, as the rigid unyielding nature of the filler prevents any torsional or unequal strains being set up in the glass. Experience has shown that glass panels mounted in a material which is in the slightest degree ductile or elastic causes the utility to fracture and hence destroys the glass panels of the device. In the matter of expansion and contraction, I have found that the expansion and contraction of the glass, the metal casing and the hardened filler to be so nearly equal as to form a perfectly solid imperishable unit; that is, the expansion and contraction of any one of the several elements is so nearly like all the other elements that no fracture, distortion or damage results, as would be the case if there was unequal expansion or contraction of the respective elements of the casing.

To provide proper illumination of the water column, without fear of blinding the engineer or fireman, I provide, in the particular exemplification, vertically disposed slots 29 in the metal sides of the casing. The object of the invention is to provide openings or slots so disposed that light will be projected into the chamber in which the water-glass is located without affecting the attendants' vision. In the specific exemplification of the invention, the light admitting openings 29 are positioned so as to register with the edges of the glass panels 22, 23; the filler 21 being cut away or provided with slots adapted to register with the slots 29. When the gage is in position, a hooded light is mounted so as to direct its light through the apertures 29, with the result that only the tubular water-glass is illuminated and the water-level easily observed; thus obviating the necessity of having a light shining directly on the glass-panels in the sight spaces.

Another novel feature of my invention is the provision of suitable means between the casing and the boiler connections. Several objections are encountered in the present type of washer. The water glasses 25 often vary in size, usually in diameter, with the result, that if when a standard sized washer is used on a water glass that is small, the joint therebetween is not water tight. Furthermore, where the usual rubber washer is employed, the high heat of the water in the water glass, melts the rubber and causes it to run down to the lower end of the water glass where it is apt to clog the orifice of the tube and permit a boiler explosion to result. As shown in the drawings, the enlarged portion in the boiler connections 14 is necessary because of the aforesaid variations in the water glasses, hence, the washer must serve as the sole means of making a water and steam tight connection between the water glass and the casing.

To overcome these difficulties I have provided a combination gasket, comprising the end members 26, 27, composed preferably of braided or woven asbestos and if desired provided with lead insets, and an intermediate member 28 preferably of rubber mounted as shown in Fig. 1. The asbestos washers are unaffected by the great heat and also by the pressure which is necessary in securing the several parts of the casing together. Hence, as pressure is brought upon the gaskets, the portion thereof surrounding the glass tube 25 is forced tightly against the outer surface of the tubing thus sealing the joint, and preventing any flow of the rubber which might result if the rubber became molten; furthermore the rubber member 28 is forced into sealing engagement with the glass 25 and the side walls of the couplings 13.

The desired hardness of the filler 21 is secured in the following manner. The filler 21 may be formed by combining equal quantities of Portland cement and crushed marble. After the filler has hardened, the casing with the filler is allowed to remain in a bath of water approximately twelve hours. It is then removed and allowed to dry whereupon it is immersed in a bath of suitable cement hardening solution about thirty minutes, and after drying is preferably given another treatment of the cement hardening substance. The filler will thus be of an extreme hardness substantially equal to that of glass so that it cannot be broken or abraded by steam or splinters or fragments of glass. The glass, filler and metal frame as hereinbefore described form a rigid and substantially imperishable unit which is adapted to withstand the unequal and varying temperatures induced by the hot water or steam flowing through or into the water-tube and the atmosphere surrounding the exterior of the gage glass, and will also adequately protect the water-tube.

I claim:

1. In a gage glass, the combination of a rigid metallic casing having side openings, flat glass panels of rectangular cross section mounted in said openings and held in place by a hydraulically setting material, a square space being outlined, and a cylindrical gage glass in said space, substantially as described.

2. In a gage glass guard, the combination of a rigid metallic casing having diametrically opposite elongated apertures, the metal surrounding the apertures being inwardly curved, glass panels having plane sides covering said openings, and a material capable of hydraulically setting, within which said panels are mounted, the setting material and the glass panels defining a rectangular space within which a gage glass is adapted to be accommodated with a relatively small space between the exterior of the glass and the sides of the opening, substantially as described.

3. A gage comprising in combination a transparent glass tube, a casing therefor, the casing having two transparent opposite walls and two closed walls, the several walls defining a central space within which said glass tube is mounted, the walls thereof being spaced from the said walls of the casing, the closed walls being provided with apertures disposed therein extending along the edges of the glass walls whereby to admit light thereto, substantially as described.

4. A gage glass, comprising an integral metal casing having sight openings in two opposite longitudinal walls thereof, rectangular glass panels disposed therein, hydraulically setting material within which the glass panels are held, the walls of the casing having their edges inturned to form pockets for said material, with the walls of the casing, at right angles to the walls having the sight openings, provided with apertures substantially throughout the length of said glass panels and in register with the edges of said glass panels whereby light is admitted thereto, and a glass tube mounted within the casing with its outer surface spaced from the inner surface of the casing walls.

5. A gage glass, comprising an integral casing having elongated and outwardly flaring sight openings in two opposite sides thereof, the ends of said casing terminating in enlarged head portions provided with internally threaded orifices adapted to receive coupling means for securing said gage glass in place and establishing communication therethrough, hydraulically setting material of substantially uniform thickness disposed on the inner walls of said casing, flat glass panels, rectangular in cross section and of comparative thickness, disposed transversely of said sight openings with the marginal edges of said panels embedded in said material, a water glass disposed longitudinally in said casing intermediate of the glass panels, and means whereby said water glass is maintained in place in intimate relation with said glass panels but without contact therewith.

6. A gage glass comprising a metallic outer casing, two opposite walls whereof are provided with elongated sight openings, hydraulically setting material of substantially uniform thickness covering the inner walls of said casing, a pair of glass panels disposed transversely of said sight openings with their marginal edges embedded in said material, the glass panels and said material being arranged to provide a chamber extending longitudinally through said casing, a water-glass arranged in said chamber in intimate relation with said glass panels but without physical contact therewith, and light admitting openings arranged in the walls of said casing and in said material adapted to admit light toward the water-glass without effecting communication between said chamber and the casing exterior.

7. A gage glass, comprising a metallic casing provided with elongated openings in opposite sides thereof, hydraulically setting material arranged along the inner walls of said casing, glass panels arranged in said casing transversely of said openings and with the marginal edges thereof embedded in said material, and light admitting openings arranged in the walls of said casing and in said material adapted to admit light into the space between said glass panels.

Signed at Chicago, Illinois, this 5th day of June, A. D. 1917.

GEORGE H. SARGENT.

Witnesses:
HENRY M. HUXLEY,
E. K. WHEATON.